US008375435B2

(12) United States Patent
Fried et al.

(10) Patent No.: US 8,375,435 B2
(45) Date of Patent: Feb. 12, 2013

(54) HOST TRUST REPORT BASED FILTERING MECHANISM IN A REVERSE FIREWALL

(75) Inventors: Eric P. Fried, Austin, TX (US); Anand Goyal, Joka (IN); Silpa Kosanam, Nagavara (IN); Suresh Sabarathinam, Chamarajpet (IN)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 12/339,542

(22) Filed: Dec. 19, 2008

(65) Prior Publication Data

US 2010/0162381 A1 Jun. 24, 2010

(51) Int. Cl.
*H04L 29/06* (2006.01)
(52) U.S. Cl. .......................................... 726/14; 726/13
(58) Field of Classification Search .................. None
See application file for complete search history.

(56) References Cited

U.S. PATENT DOCUMENTS

| | | | |
|---|---|---|---|
| 6,725,378 B1 | 4/2004 | Schuba et al. | |
| 6,789,190 B1 | 9/2004 | Cohen | |
| 6,854,063 B1 * | 2/2005 | Qu et al. ........................ | 726/13 |
| 7,047,564 B2 | 5/2006 | Cohen | |
| 7,536,715 B2 * | 5/2009 | Markham ....................... | 726/11 |
| 7,571,479 B2 * | 8/2009 | Eastlake, III ................... | 726/23 |
| 7,953,969 B2 * | 5/2011 | Neystadt et al. .............. | 713/155 |
| 2003/0046577 A1 * | 3/2003 | Silverman ..................... | 713/200 |
| 2003/0084317 A1 | 5/2003 | Cohen | |
| 2004/0264371 A1 | 12/2004 | Chen | |
| 2005/0144441 A1 * | 6/2005 | Govindarajan ............... | 713/160 |
| 2005/0259645 A1 * | 11/2005 | Chen et al. .................... | 370/389 |
| 2006/0190998 A1 | 8/2006 | Aiello et al. | |
| 2006/0236401 A1 * | 10/2006 | Fosdick ......................... | 726/25 |
| 2007/0073660 A1 * | 3/2007 | Quinlan ............................ | 707/3 |
| 2007/0162587 A1 * | 7/2007 | Lund et al. ..................... | 709/223 |
| 2007/0204338 A1 | 8/2007 | Aiello et al. | |
| 2008/0175226 A1 * | 7/2008 | Alperovitch et al. .......... | 370/352 |
| 2008/0222715 A1 * | 9/2008 | Bansal et al. ................... | 726/11 |
| 2008/0270601 A1 * | 10/2008 | Ishikawa ....................... | 709/224 |

OTHER PUBLICATIONS

Author: CS3,INC.; Title: The Reverse Firewall: Defeating DDoS Attacks Emerging from Local Area Networks; Item: article; Date: unknown; pp. 6; Publisher: Cs3, Inc., Los Angeles, California, US; Location: http://www.cs3-inc.com/rfw.html.

* cited by examiner

*Primary Examiner* — Nathan Flynn
*Assistant Examiner* — Michael R Vaughan
(74) *Attorney, Agent, or Firm* — David Mims; Robert C. Rolnik

(57) ABSTRACT

Disclosed is a computer implemented method and computer program product to throttle traffic from a source internet protocol address. The reverse firewall inspects payloads of a plurality of packets each packet having a source address identical to the source internet protocol address and a target address corresponding to a receiver host. Responsive to detecting purported good content within at least one of the plurality of packets, the reverse firewall forwards packets having the source address. The reverse firewall determines whether a count of packets having the source address exceeds a safe threshold. The reverse firewall requests a demanded positive trust report from the receiver host, responsive to a determination that the count of packets having the source address exceeds the safe threshold. The reverse firewall determines whether a positive trust report is received from the receiver host that indicates that the source internet protocol address is good. The reverse firewall analyzes a header of packet having the source address without analyzing a payload of the packet, responsive to a determination that the positive trust report is received from the receiver host.

12 Claims, 5 Drawing Sheets

310

| SENDER/RECEIVER | PACKET COUNT | THRESHOLD |
|---|---|---|
| A → B FIRST | 255 | 500 |
| A → D SECOND | 111 | 1000 — 313 |
| A → E FIRST | 999 | 1000 |

| |
|---|
| SENDER ADDRESS |
| REVERSE FIREWALL ADDRESS |
| RECEIVER ADDRESS |
| TRUST SETTING: -1/0/1 |

| FIREWALL NAME/ADDRESS | THRESHOLD |
|---|---|
| DEMANDED TRUST REPORT FOR REVERSE FIREWALL X | 3 — 333 |
| DEMANDED TRUST REPORT FOR REVERSE FIREWALL Y | 9 |
| DEMANDED TRUST REPORT FOR REVERSE FIREWALL Z | 11 |

FIG. 3C

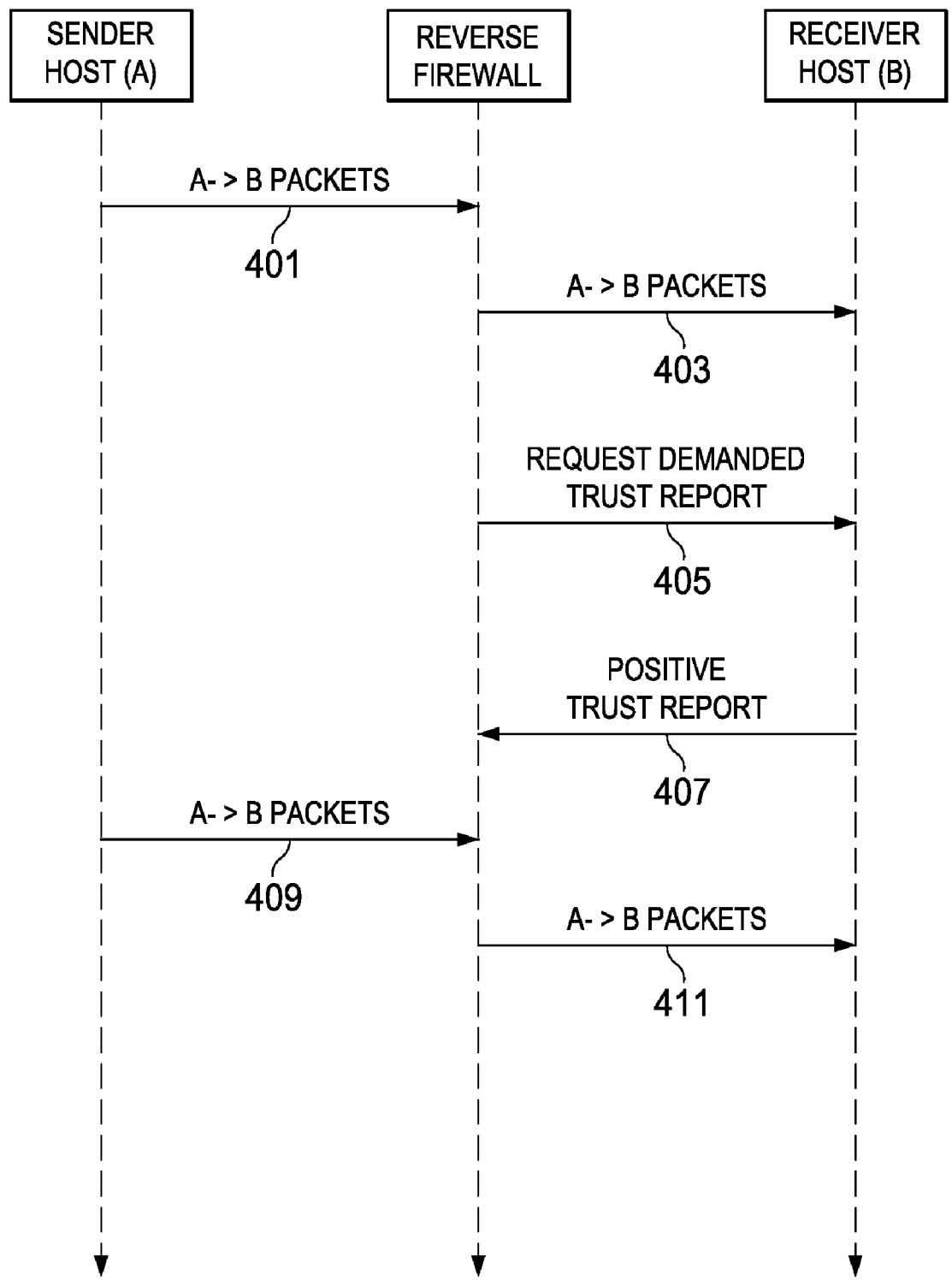

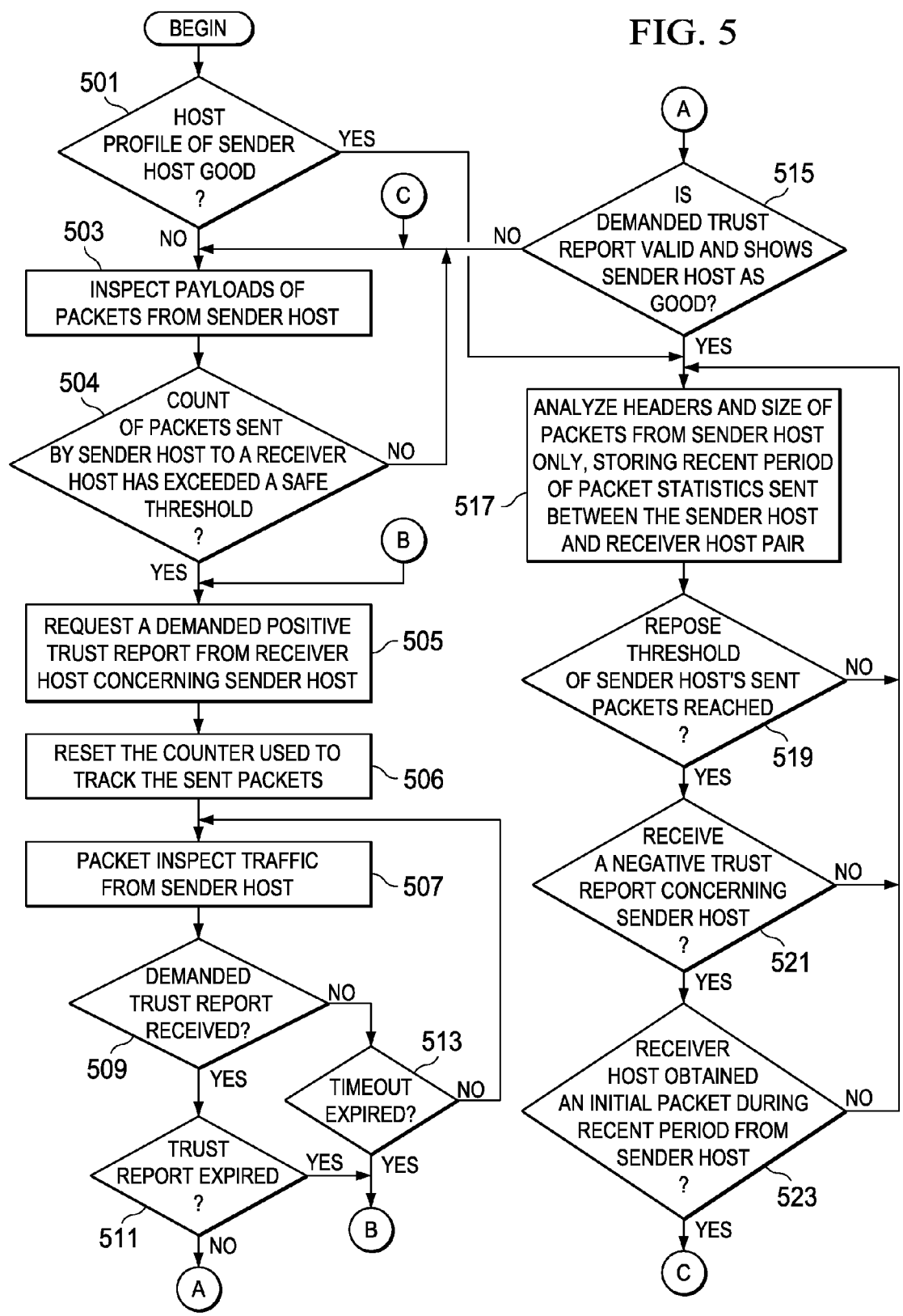

HOST TRUST REPORT BASED FILTERING MECHANISM IN A REVERSE FIREWALL

BACKGROUND OF THE INVENTION

1. Field of the Invention

The present invention relates generally to a computer implemented method and computer program product for detecting and reducing malicious packet traffic. More specifically, the present invention relates to reverse firewalls.

2. Description of the Related Art

Modern computers are multipurpose devices readily modified by adding applications and other computer instructions to cause the computer to perform different tasks. At the inception of the age of personal computers, software was typically made available on magnetic and disk media. However, such media is costly to produce, as well as added shipping costs to sell through normal bricks-and-mortar stores. Recently, users of computers have shifted to obtaining software by download over the internet. Such a practice eliminates many time-consuming steps.

Nevertheless, such a model for software distribution has created security vulnerabilities. Malicious software developers created software programs to commandeer computers and produce results unwanted by the user. Such developers deliver their malicious code by internet connections, which are sometimes detected before damage is done.

Detection of such connections is typically accomplished using firewalls. Firewalls may be available at three junctions in the network. First, a personal computer may provide a firewall as an application that monitors the network port. Like most firewalls, a personal firewall monitors packets for illicit content and flags connections that fit a profile or rule. Such a flagged connection may require the attention of the user to determine if the content is likely to damage the operation of the applicable personal computer. A second firewall is a LAN firewall established as a computer at the outward facing interface of a local area network (LAN). Such a firewall monitors traffic arriving to the LAN from the outside world, including, for example, the internet. This firewall can protect computers within the LAN from intrusion.

A third firewall type is a reverse firewall. A reverse firewall, like a LAN firewall, can be located at the edge of a LAN. However, a reverse firewall also monitors traffic that arrives from within the LAN with destinations to receiver hosts outside the LAN. Accordingly, a function of the reverse firewall is to detect malicious packets outbound from the LAN and block any traffic that appears malicious.

The task of the reverse firewall can be burdensome. The reverse firewall is occupied with the task of examining packets in real-time and promptly forwarding all benign packets. This task consumes computer resources. In particular, examining the content of packet payloads takes a toll on the reverse firewall.

SUMMARY OF THE INVENTION

The present invention provides a computer implemented method and computer program product to throttle traffic from a source internet protocol address. The reverse firewall inspects payloads of a plurality of packets, each packet having a source address identical to the source internet protocol address and a target address corresponding to a receiver host. Responsive to detecting purported good content within at least one of the plurality of packets, the reverse firewall forwards packets having the source address. The reverse firewall determines whether a count of packets having the source address exceeds a safe threshold. The reverse firewall requests a demanded positive trust report from the receiver host, responsive to a determination that the count of packets having the source address exceeds the safe threshold. The reverse firewall determines whether a positive trust report is received from the receiver host that indicates that the source internet protocol address is good. The reverse firewall analyzes a header of packet having the source address without analyzing a payload of the packet, responsive to a determination that the positive trust report is received from the receiver host.

BRIEF DESCRIPTION OF THE DRAWINGS

The novel features believed characteristic of the invention are set forth in the appended claims. The invention itself, however as well as a preferred mode of use, further objectives and advantages thereof, will best be understood by reference to the following detailed description of an illustrative embodiment when read in conjunction with the accompanying drawings, wherein:

FIG. 3A is a data structure that associates packet counts to a sender host and receiver host pair in accordance with an illustrative embodiment of the invention;

FIG. 3B is a trust report format in accordance with an illustrative embodiment of the invention;

FIG. 3C is a receiver host data structure to track reverse firewalls in accordance with an illustrative embodiment of the invention;

FIG. 4 is a timing diagram of communications sent among a sender host, a reverse firewall and a receiver host in accordance with an illustrative embodiment of the invention;

FIG. 5 is a flowchart of a process the reverse firewall may perform to determine a screening level to apply to packets arriving from a sender host in accordance with an illustrative embodiment of the invention.

DETAILED DESCRIPTION OF THE PREFERRED EMBODIMENT

Figure 1:
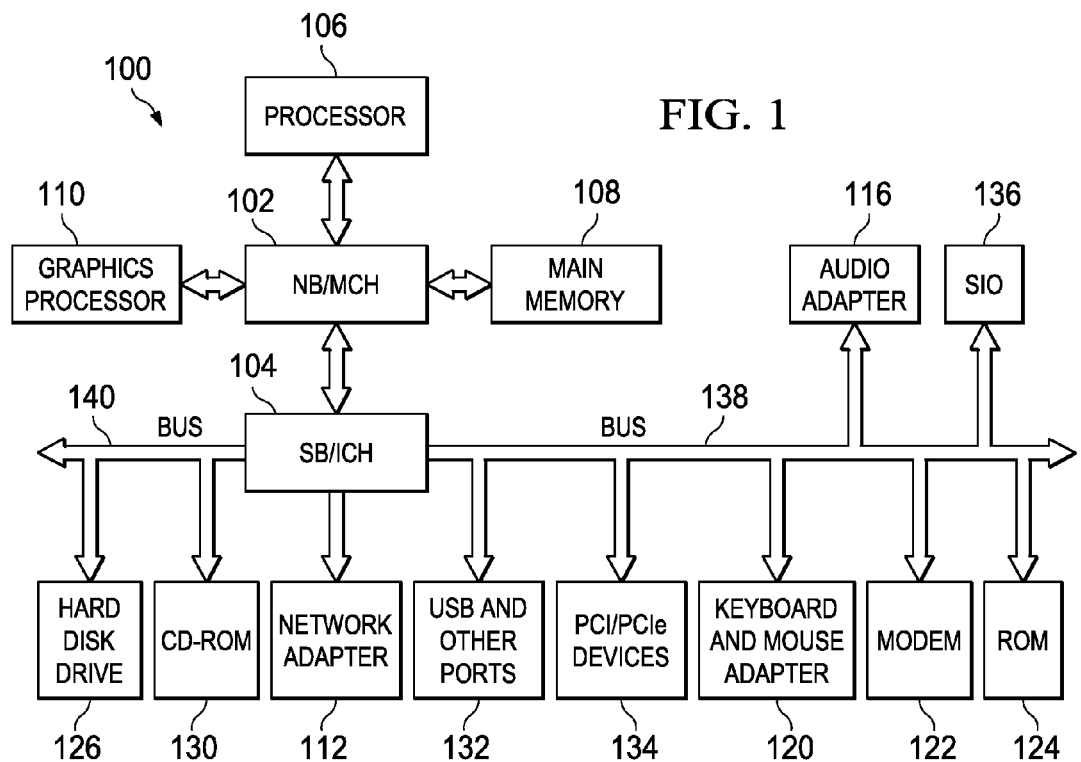
FIG. 1 is a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk. C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the internet using an internet service provider (ISP).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method, data processing system, and computer program product for periodically relaxing packet inspection performed on traffic from a given source and destined for a receiver host. Such a relaxation of packet inspection may be performed in response to independent acknowledgment that such traffic is determined to be benign. Such independent acknowledgment may come from a receiver host.

Figure 2:
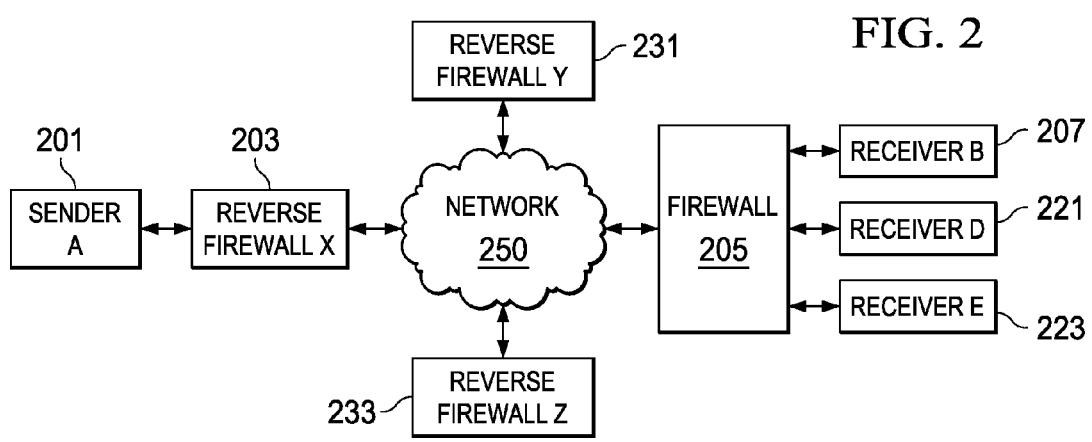
FIG. 2 shows a sender host or source host interacting with a reverse firewall and a receiver host in accordance with an illustrative embodiment of the invention.

FIG. 2 shows a sender host or source host interacting with a reverse firewall and a receiver host in accordance with an illustrative embodiment of the invention. Sender host A 201 can be a source of a plurality of packets making up a traffic stream. Each packet may be divided into control information and a payload. The control information may include a source address and a target address. A source address is an identifier of a data processing system that is a source or at least a purported source for a packet. The identifier may be an internet protocol (IP) address. Similarly, a target address is an identifier of an interface to a data processing system that is a target or a receiver host. The target address can be an IP address. Moreover, the target address can be an IP address that is later translated or otherwise modified to be a localized address for a receiver host within a LAN. Such a modification can allow flexibility in the addressing of computers within a LAN, among other things.

A header is a portion of a packet that contains a source address and a target address. The header may include additional information such as, for example, validity checking bits, serial number for the packet, among other features. In contrast, the payload is a part of a packet that carries user data for the receiver host. The user data may be flexibly used to support streaming media, email, hypertext transport protocol, encryption, among a myriad other forms of content. Moreover, the user data may carry computer instructions. It is the computer instructions that the firewall chiefly monitors.

Ideally, the reverse firewall uses heuristics called filtration rules to detect any virus signatures. However, virus writers frequently develop new viruses not well know to the firewall manufacturers. Accordingly, such new exploits can evade the some filtration rules. One or more illustrative embodiments may benefit from feedback from remote receiver hosts to alert a network administrator of an attack or other exploit performed within the LAN the network administrator manages. Nevertheless, the filtration rules may be incomplete with respect to the constantly evolving set of viruses to guard against. As a result, the packets forwarded from a reverse firewall have purported good content within their payloads. Purported good content is packet payloads that have initially been screened by a firewall and forwarded through the network. Screening can be, for example, a simple assessment of the count of packets sent from a particular sender host. Alternatively, screening can be a more involved packet inspection and comparison to known virus signatures.

Sender host A 201 interacts with network 250 via reverse firewall X 203. Additional reverse firewalls, reverse firewall Y 231 and reverse firewall Z 233, may similarly filter traffic originating on associated LANs (not shown). A receiver host may be located within a LAN protected by firewall 205. A receiver host is a host that receives packets arriving from a network. The receiver host may transmit acknowledgment packets in response to receiving packets. In addition, a receiver host may also be able to support functionality to initiate packet transfers on its own. Within the LAN can be receiver host B 207, receiver host D 221, and receiver host E 223. Each host has an IP address. The sender host A has a source IP address. A source IP address is an IP address that identifies a host that sends packets through a network. Similarly, receiver host B 207 has a target IP address.

As an example, a packet that is sent from sender host A 201 to receiver host B 207 may cross several routers or entities. The packet may be first evaluated at reverse firewall X 203. The packet can then be forwarded to network 250. The network can then forward the packet to firewall 205. Firewall 205 may further forward the packet to receiver host B 207. There can be three firewalls that may detect malicious traffic along this path, reverse firewall X 203, firewall 205, and any personal firewall running on receiver host B 207.

A reverse firewall may keep several data structures to track progress of traffic from a source or sender host to a target or receiver host. The data structures may record counts of packets with reference to a time when a trust report arrived at the firewall.

FIG. 3A is a data structure that associates packet counts to a sender host and receiver host pair in accordance with an illustrative embodiment of the invention. Data structure 310 keeps a count of packets received from a sender host during a probationary period that the sender host sends to a receiver host. The sender host may have a status of "suspect" noted within a host profile. A host profile is an indication of a status of a sender host in relation to traffic evaluated by one or more firewalls. In particular, the host profile provides a status of the sender host as given by the receiver host. Thus, a host profile applies to a pairing of a sender host with a receiver host. Accordingly, a host profile can be "suspect" or "bad" in response to a firewall making a negative trust report concerning the sender host. In addition a bad host profile may be an initial setting that a sender host is assigned when it joins a network. The host profile may be stored within a reverse firewall. Alternatively, for a given sender host, the sender host may be marked "good" in response to receiving a positive trust report from a receiver host. The host profile may simply be a bit associated with a sender host and receiver host. Accordingly, a good host profile may be a bit set as '1' associated with a sender host and a receiver host.

Data structure 310 is made up of entries. Each entry includes a pairing of a sender host with a receiver host. The entries may be indexed accordingly by the combined IP addresses of sender host and a receiver host. An entry may include a packet count 311, as well as a threshold 313. The threshold may be a safe threshold. A safe threshold is a number used as a rule to compare a counted set of packets in order to determine if the counted packets exceed the safe threshold. The safe threshold can be a system tunable. Alternatively, a system administrator may set a safe threshold on a per sender host basis or on a per sender host/receiver host pair basis.

Thus, for example, data structure 310 can have an entry corresponding to sender host A 201, and receiver host D 221 of FIG. 2. The safe threshold for this pairing of sender host and receiver host can be 1000. The packet count sent from sender host A 201 to receiver host D 221 can be 111, as shown in packet count 311. The packet count may increase until the reverse firewall resets the count. Periodically, the reverse firewall may compare the count to the safe threshold within an entry. When the count exceeds the corresponding safe threshold, the reverse firewall may establish a corresponding sender host as having a good host profile.

FIG. 3B is a trust report format 320 in accordance with an illustrative embodiment of the invention. A receiver host to a reverse firewall transmits the trust report. Intermediate nodes in a network to reach the reverse firewall may forward the trust report.

A trust report may include a sender address, a reverse firewall address, a receiver address, and a trust setting. The reverse firewall address is the address to which the receiver host sends the trust report. The sender address may be an address the receiver host queried. In other words, the sender address can be that of a sender host, for example, sender host 201 of FIG. 2. The sender address can be either the address of the sender host within its associated LAN or the address of the sender host as given to the network by the reverse firewall, for example, reverse firewall X 203 of FIG. 2. Alternatively, the sender address may be an address that the receiver host has independently determined to be sending malicious content in a packet. The receiver address is the address of the receiver host from which the report originates. The receiver address may be, for example, an internet protocol (IP) address combined with a Media Access Control (MAC) address. The receiver address can be a unique address associated only with the receiver host.

A positive trust report is a trust report that carries a positive indication. The positive indication may be, e.g., a binary 1. In contrast, a negative trust report is a trust report that carries a negative indication. The negative indication may be, for example, a binary 0.

A demanded positive trust report may be in the same form as a trust report. However, a demanded trust report originates with a reverse firewall. In addition, the demanded trust report supplies a receiver address which coincides with the receiver host to which the reverse firewall directs the demanded trust report packet(s). The trust setting for the demanded positive trust report can be set to −1. A demanded positive trust report is a query, dispatched by a reverse firewall that identifies a sender host for which additional information is requested. The additional information can be the evaluation by the receiver host of any negative or positive result of the sender host with respect to any filtration rules used locally by the receiver host.

FIG. 3C is a receiver host data structure to track reverse firewalls in accordance with an illustrative embodiment of the invention. A receiver host may track a quantity of demanded positive trust reports from reverse firewalls. Table 330 provides a threshold number for each reverse firewall. For example, the threshold number "3" 333 is a threshold corresponding to reverse firewall X 203 in FIG. 2. Accordingly, the receiver host may use table 330 to identify an abusively high number of demanded trust reports and ignore such demanded trust reports if too many arrive during a recent period. Thus, a threshold number is a number used by a receiver host to filter out demanded positive trust reports determined to be excessive.

FIG. 4 is a timing diagram of communications sent among a sender host, a reverse firewall and a receiver host in accordance with an illustrative embodiment of the invention. The sender host may initially send packet 401 from, for example, sender host A to receiver host B. The reverse firewall may process such a packet and forward the packet as packet 403. Packet 403 is received by receiver host. Next, the reverse firewall may transmit request for demanded trust report 405. The request is subsequently received by receiver host B.

The receiver host may transmit a positive trust report 407. The reverse firewall may further process the positive trust report 407. Next, the sender host may transmit a second packet 409. The reverse firewall may forward the packet as forwarded second packet 411. The reverse firewall may forward that packet based on a reduced screening. The selection of a reduced screening as compared to a detailed screening may be based on the positive trust report.

FIG. 5 is a flowchart of a process the reverse firewall may perform to determine a screening level to apply to packets arriving from a sender host in accordance with an illustrative embodiment of the invention. The reverse firewall may be organized, for example, in a manner according to data processing system 100 of FIG. 1. The reverse firewall may initially determine if a host profile of a sender host is a good host profile (step 501). Each pair of sender host and receiver host may initially be set to have a negative or bad host profile. A negative determination at step 501 may cause the reverse firewall to inspect payloads of packets from the sender host (step 503). Step 503 may include sub-steps that include a) dropping packets that failed a criterion; b) forwarding packets that met a criterion; and c) counting packets from a sender host to a receiver host. The criterion that is applied may be one of several filtration rules set by a network administrator, a firewall vendor or both.

Next, the reverse firewall may determine whether a count of packets sent by sender host to a receiver host has exceeded a safe threshold (step 504). The safe threshold can be used to determine if the sender host can be trusted. Thus, if safe threshold is exceeded the reverse firewall may trust the sender host. A negative determination at step 504 may cause the reverse firewall to repeat step 503, with respect to packets arriving from the sender host targeting the receiver host. A positive result to step 504 may cause the reverse firewall to request a demanded positive trust report from the receiver host concerning the sender host (step 505).

Next, the reverse firewall may reset a counter used to track the sent packets (step 506). Next, the reverse firewall may inspect sender host traffic (step 507). Step 507 may be performed in the same manner as step 503. Next, the reverse firewall may determine if a demanded trust report is received (step 509). If not, the reverse firewall may determine if a timeout has expired for the demanded trust report to arrive (step 513). If the timeout has expired, the reverse firewall may repeat requesting a demanded positive trust report at step 505. A timeout period is a predetermined time value set by a network administrator to identify a duration that a responding device has to respond. A response after the timeout period can be treated as an invalid response. Otherwise, the reverse firewall may continue to inspect traffic from the sender host at step 507.

If the demanded trust report is received, the reverse firewall may determine if the trust report is expired (step 511). If the trust report is expired, the reverse firewall may repeat requesting a demanded positive trust report at step 505. Otherwise, the reverse firewall may determine whether the demanded trust report is valid and shows that the sender host is good (step 515). That is, the reverse firewall may determine if it received a positive trust report concerning the sender host. A demanded trust report that is valid is a demanded trust report that is properly formed.

If step 515 is negative, the reverse firewall may repeat step 503, and accordingly count upward from a reset count value. However, if step 515 is positive, the reverse firewall may operate in a mode of diminished screening. The diminished screening is a screening level that is less processor intensive than the screening that is applied at steps 503 and 507.

Accordingly, the reverse firewall, during diminished screening, may analyze only headers and, optionally, sizes of packets from the sender host as well as storing a recent period of packet statistics sent between the applicable sender host and receiver host pair (step 517). A recent period of packet statistics may be a period of about two seconds. The recent period may govern a determination at step 523, below. Next, the reverse firewall may determine if a repose threshold of a sender host's sent packets is reached (step 519). A repose threshold is a threshold used to permit a sender host to send packets until the threshold is reached, without added scrutiny. After the repose threshold is reached, a reverse firewall may consider negative trust reports and apply detailed screening to the sender host in response to such negative trust reports. If a repose count of packets received from the sender host to the receiver host since the positive trust report does not exceed the repose threshold, the reverse firewall repeats step 517. A repose count is a count tracked by a reverse firewall to determine whether a number of packets received at a receiver host from a sender host since a trust report having a good status was received from the receiver host concerning the sender host. A repose count is a count tracked by a reverse firewall to measure a number of packets received at a receiver host from a sender host since receiving a positive trust report concerning the sender host.

However, if the repose count exceeds the repose threshold, the reverse firewall may determine whether a negative trust report concerning the sender host is received (step 521). If a negative trust report is not received, then processing continues at step 517. However, if a negative trust report is received, the reverse firewall may determine whether the receiver host obtained an initial packet during the recent period from the sender host (step 523). A received packet from the sender host may validate that the negative trust report is responsive to bad traffic from the sender host.

A negative result at step 523 may cause the reverse firewall to ignore the negative trust report. Thus, the reverse firewall may continue to repeat step 517. However, a positive result to step 523 may cause the firewall to return to step 503. A positive determination at step 501, as well, may cause the reverse firewall to perform step 517.

Receiver hosts may send two types of trust reports. The receiver host may send a positive trust report or a negative trust report to the reverse firewall. The receiver host determines the reverse firewall's address by reading the reverse firewall's address from a request for a demanded positive trust report. The receiver host may retain the reverse firewall's address also for use when the receiver host transmits a negative trust report based on a determination made at the receiver host.

Figure 6:
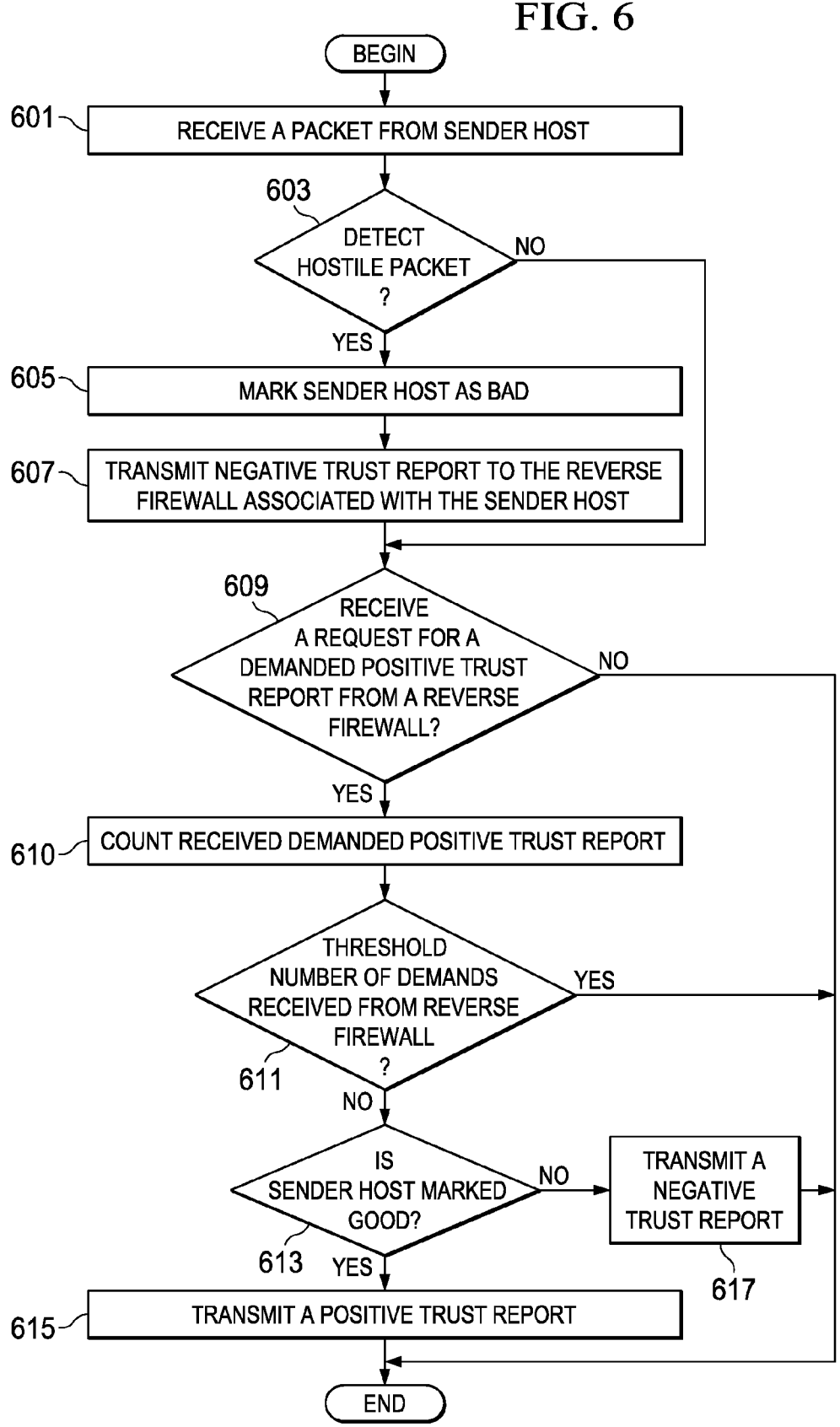
FIG. 6 is a flowchart of steps performed by a receiver host to respond and coordinate with a reverse firewall in accordance with an illustrative embodiment of the invention.

FIG. 6 is a flowchart of steps performed by a receiver host to respond and coordinate with a reverse firewall in accordance with an illustrative embodiment of the invention. Initially, the receiver host receives a packet from sender host (step 601). Next, the receiver host determines whether it detected a hostile packet (step 603). A hostile packet may contain suspect hostile content within a payload. The suspect hostile content is content that satisfies at least one criterion of a filtration rule. The suspect hostile content can be hostile content or a false positive hostile content. If the receiver host received a hostile packet, the receiver host may mark the sender host as bad (step 605). Next, the receiver host may transmit a negative trust report to a reverse firewall associated with the sender host (step 607).

Next, the receiver host may determine if it received a request for a demanded positive trust report from a reverse firewall (step 609). Step 609 may also be reached based on a negative result to step 603. A positive result to step 609 may cause the receiver host to count received demanded positive trust reports. A count of received demanded positive trust report (step 610) can be a count of received demanded positive trust reports that arrived from a particular reverse firewall within a recent period. Next, the receiver host may determine if a threshold number of demands has been received from reverse firewall (step 611). Step 611 may establish the threshold number to be a number of demands for trust report received during a recent time interval or fixed time interval. Such a threshold number may be available from, for example, table 330 of FIG. 3C. In other words, if too many demands for demanded trust report arrive too quickly, the receiver host may ignore such demands. Accordingly, if step 611 is positive, processing terminates thereafter. In addition, if no demand for a demanded trust report arrives, processing may terminate.

However, a negative result to step 611 may cause the receiver host to determine if the sender host is marked good (step 613). If the sender host is marked good, the receiver host transmits a positive trust report (step 615). Otherwise, the receiver host transmits a negative trust report (step 617). Processing may terminate thereafter.

The illustrative embodiments permit a reverse firewall to respond to reports from hosts outside the local area network associated with the firewall. Accordingly, the reverse firewall may correlate such reports to specific sender hosts within the local area network to determine if a host is a candidate for elevated screening of packets. Otherwise, the reverse firewall may relax screening for hosts that are without recent negative trust reports or have a positive trust report.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method to throttle traffic from a source internet protocol address, the method comprising:
    inspecting payloads of a plurality of packets, each packet having a source address identical to the source internet protocol address and a target address corresponding to a receiver host;
    responsive to detecting purported good content within at least one of the plurality of packets, forwarding packets having the source address;
    determining whether a count of packets having the source address exceeds a safe threshold;
    responsive to a determination that the count of packets having the source address exceeds the safe threshold, requesting a demanded positive trust report from the receiver host;
    determining whether a positive trust report is received from the receiver host that indicates that the source internet protocol address is good;
    responsive to a determination that the positive trust report is received from the receiver host, analyzing a header of a packet having the source address without analyzing a payload of the packet; and
    determining if the source internet protocol address lacks an association with a good host profile, wherein the step of inspecting payloads is responsive to the determination that the source internet protocol address lacks association with the good host profile.

2. A computer program product for throttling traffic from a source internet protocol address, the computer program product comprising:
    one or more computer-readable, tangible storage devices having computer usable program code embodied therewith, the computer program product comprising:
    computer usable program code configured to inspect payloads of a plurality of packets, each packet having a source address identical to the source internet protocol address and a target address corresponding to a receiver host;
    computer usable program code configured to forward packets having the source address, responsive to detecting purported good content within at least one of the plurality of packets;
    computer usable program code configured to determine whether a count of packets having the source address exceeds a safe threshold;
    computer usable program code configured to request a demanded positive trust report from the receiver host, responsive to a determination that the count of packets having the source address exceeds the safe threshold;
    computer usable program code configured to determine whether a positive trust report is received from the receiver host that indicates that the source internet protocol address is good;
    computer usable program code configured to analyze a header of a packet having the source address without analyzing a payload of the packet, responsive to a determination that the positive trust report is received from the receiver host; and
    computer usable program code configured to determine if the source internet protocol address lacks an association with a good host profile, wherein the step of inspecting payloads is responsive to the determination that the source internet protocol address lacks association with the good host profile.

3. A computer implemented method to throttle traffic from a source internet protocol address, the method comprising:

inspecting payloads of a plurality of packets, each packet having a source address identical to the source internet protocol address and a target address corresponding to a receiver host;

responsive to detecting purported good content within at least one of the plurality of packets, forwarding packets having the source address;

determining whether a count of packets having the source address exceeds a safe threshold;

responsive to a determination that the count of packets having the source address exceeds the safe threshold, requesting a demanded positive trust report from the receiver host;

determining whether a positive trust report is received from the receiver host that indicates that the source internet protocol address is good; and responsive to a determination that the positive trust report is received from the receiver host, analyzing a header of a packet having the source address without analyzing a payload of the packet;

responsive to a determination that the positive trust report is received from the receiver host, counting packets having the source internet protocol address to form a repose count;

determining whether the repose count exceeds a repose threshold;

responsive to a determination that the repose count exceeds the repose threshold, determining whether a negative trust report is received by the receiver host concerning the source internet protocol address; and responsive to a determination that the negative trust report is received by the receiver host concerning the source internet protocol address, determining whether a packet from the source internet protocol address was sent to receiver host in a recent period.

4. The computer implemented method of claim 3, further comprising:

resetting the count of packets from the source internet protocol address in response the determination that the packet from the source internet protocol address was sent to the receiver host in the recent period; and determining whether the count of packets from the source internet protocol address exceeds the safe threshold.

5. The computer implemented method of claim 4, wherein the trust report is received within a timeout period and is unexpired.

6. The computer implemented method of claim 4, wherein the trust report is valid and positive.

7. The computer implemented method of claim 4, wherein the recent period is during a prior two second interval.

8. A computer program product for throttling traffic from a source internet protocol address, the computer program product comprising:

one or more computer-readable, tangible storage devices having computer usable program code embodied therewith, the computer program product comprising:

computer usable program code configured to inspect payloads of a plurality of packets, each packet having a source address identical to the source internet protocol address and a target address cones corresponding to a receiver host;

computer usable program code configured to forward packets having the source address, responsive to detecting purported good content within at least one of the plurality of packets;

computer usable program code configured to determine whether a count of packets having the source address exceeds a safe threshold;

computer usable program code configured to request a demanded positive trust report from the receiver host, responsive to a determination that the count of packets having the source address exceeds the safe threshold;

computer usable program code configured to determine whether a positive trust report is received from the receiver host that indicates that the source internet protocol address is good;

computer usable program code configured to analyze a header of packet having the source address without analyzing a payload of the packet, responsive to a determination that the positive trust report is received from the receiver host;

computer usable program code configured to count packets having the source internet protocol address to form a repose count, responsive to a determination that the positive trust report is received from the receiver host;

computer usable program code configured to determine whether the repose count exceeds a repose threshold;

computer usable program code configured to determine whether a negative trust report is received by the receiver host concerning the source internet protocol address, responsive to a determination that the repose count exceeds the repose threshold; and computer usable program code configured to determine whether a packet from the source internet protocol address was sent to receiver host in a recent period, responsive to a determination that the negative trust report is received by the receiver host concerning the source internet protocol address.

9. The computer program product of claim 8, further comprising:

computer usable program code configured to reset the count of packets from the source internet protocol address in response the determination that the packet from the source internet protocol address was sent to the receiver host in the recent period; and computer usable program code configured to determine whether the count of packets from the source internet protocol address exceeds the safe threshold.

10. The computer program product of claim 9, wherein the trust report is received within a timeout period and is unexpired.

11. The computer program product of claim 9, wherein the trust report is valid and positive.

12. The computer program product of claim 9, wherein the recent period is during a prior two second interval.

* * * * *